(12) United States Patent
Arich

(10) Patent No.: US 6,951,439 B2
(45) Date of Patent: Oct. 4, 2005

(54) DUST COLLECTION UNIT

(75) Inventor: Klaus-Dieter Arich, Huenstetten-Beuerbach (DE)

(73) Assignee: Black & Decker, Newark, DE (US)

( * ) Notice: Subject to any disclaimer, the term of this patent is extended or adjusted under 35 U.S.C. 154(b) by 0 days.

(21) Appl. No.: 10/804,365

(22) Filed: Mar. 19, 2004

(65) Prior Publication Data

US 2004/0208715 A1 Oct. 21, 2004

(30) Foreign Application Priority Data

Mar. 21, 2003 (GB) .............................................. 0306484

(51) Int. Cl.⁷ .............................................. B23G 11/00
(52) U.S. Cl. ............................ 408/67; 175/299; 15/414
(58) Field of Search ............................ 408/67; 175/299; 15/414, 415.1, 420, 339, 344; 409/137; 144/252.1, 252.2; 29/DIG. 86, DIG. 84; 83/100; 173/71, 199

(56) References Cited

U.S. PATENT DOCUMENTS

| | | |
|---|---|---|
| 2,041,689 A | 5/1936 | Baumeister et al. |
| 2,082,418 A | 6/1937 | Palmer et al. |
| 2,144,586 A | 1/1939 | Kelly |
| 2,145,939 A | 2/1939 | Markley |
| 2,483,060 A | 9/1949 | Niedelman et al. |
| 2,730,335 A | 1/1956 | Lamprecht |
| 2,829,867 A | 4/1958 | Brochetti |
| 3,776,647 A | * 12/1973 | Hart ...................... 408/241 G |

(Continued)

FOREIGN PATENT DOCUMENTS

| | | | |
|---|---|---|---|
| DE | 19543599 A1 | * 5/1997 | ........... B23B/00/00 |
| DE | 100 46 814 A1 | 4/2002 | |
| EP | 0 426 321 A | 5/1991 | |
| FR | 2 399 297 A | 3/1979 | |
| GB | 2067106 A | * 7/1981 | ........... B23B/47/34 |
| GB | 2096030 A | * 10/1982 | ........... B23B/47/34 |
| GB | 2 130 715 A | 6/1984 | |
| GB | 2 333 478 A | 7/1999 | |
| GB | 2 343 645 A | 5/2000 | |
| WO | WO 95/20440 A1 | 8/1995 | |

*Primary Examiner*—Derris H. Banks
*Assistant Examiner*—J Williams
(74) *Attorney, Agent, or Firm*—Michael P. Leary; Charles E. Yocum; Adan Ayala

(57) ABSTRACT

A dust collection unit suitable for use with a hand held drilling and/or hammering tool, comprising a shroud (34) which is adapted to extend around a tool or bit (24) of such a hammering and/or drilling tool so as to collect dust in an airflow passing through the shroud which dust is generated by such a tool or bit. A tube like extension sleeve (28) extends forwardly from the shroud, with respect to such a tool or bit, which extension sleeve (28) is tapered at its forward end so as to have a forward rim which fits into a corner of a surface to be worked. A slideable sleeve (54) is slideably mounted on the extension sleeve so as to move between a retracted position in which the tapered forward rim of the extension sleeve (28) is engageable with a corner surface to be worked and an extended position in which a forward rim of the slideable sleeve (54) is engageable with a surface to be worked.

21 Claims, 3 Drawing Sheets

U.S. PATENT DOCUMENTS

| | | | |
|---|---|---|---|
| 3,850,254 A | 11/1974 | Hirdes | |
| 3,907,452 A | 9/1975 | Tripp | |
| 4,064,952 A | 12/1977 | Lechner | |
| 4,097,176 A | 6/1978 | Wanner et al. | |
| 4,184,226 A | 1/1980 | Loevenich | |
| 4,207,953 A | 6/1980 | Reibetanz | |
| 4,250,971 A | 2/1981 | Reibetanz | |
| 4,256,422 A | 3/1981 | Theissig et al. | |
| 4,471,844 A | 9/1984 | Gallagher | |
| 4,606,092 A | 8/1986 | Henning | |
| 4,723,338 A | 2/1988 | Otsubo | |
| 4,915,550 A | 4/1990 | Arai et al. | |
| 5,061,123 A * | 10/1991 | Broussard | 408/67 |
| 5,090,499 A | 2/1992 | Cuneo | |
| 5,160,230 A * | 11/1992 | Cuevas | 408/67 |
| 5,371,912 A | 12/1994 | Hall | |
| 5,467,835 A | 11/1995 | Obermeier et al. | |
| 5,605,421 A * | 2/1997 | Hodgson | 408/67 |
| 5,667,565 A * | 9/1997 | Gondar | 96/60 |
| 5,688,082 A * | 11/1997 | Richardson | 408/67 |
| 5,904,453 A * | 5/1999 | Gavia | 408/67 |
| 5,983,445 A * | 11/1999 | Baker | 15/339 |
| 6,079,078 A * | 6/2000 | Byington | 15/339 |
| 6,145,162 A | 11/2000 | Deutschenbaur et al. | |
| 6,196,775 B1 | 3/2001 | Aubin et al. | |
| 6,247,879 B1 * | 6/2001 | Costa | 408/112 |
| 6,367,468 B1 | 4/2002 | Edwards et al. | |
| 6,413,022 B1 * | 7/2002 | Sarh | 408/76 |

* cited by examiner

DUST COLLECTION UNIT

The present invention relates to a dust collection unit suitable for use with a hand held drilling and/or hammering tool and to a shroud and a shroud adapter for such a dust collection unit.

BACKGROUND OF THE INVENTION

Hand held drilling and/or hammering tools are know which can be used with a dust collection unit accessory. The collection unit, may be releaseably mechanically mounted on the tool and will generally comprise a shroud for collecting dust from the region of a tool or bit of the tool, a dust collection chamber, a filter and a system for generating an airflow into and through the shroud, the chamber and the filter. Dust and debris generated by the tool or bit of the tool will be entrained in this airflow and so will be pulled through the shroud and into the chamber. As the air passes through the filter, any dust or debris entrained within it will be deposited in the chamber.

In some known designs of shroud, for example of the type shown on the dust collection unit of FIG. 2, the shroud (32) is mounted on a support arm (36) within which support arm is formed a channel which communicates between the shroud and a dust collection chamber (41). A problem with such designs is that the shroud has an extension (14) for fitment to the support arm (36) which prevents the shroud from fitting into difficult to reach places. For example the shroud cannot easily be positioned so as to fit around pipes or ducting, to drill a hole closer than a distance $d_1$ above the edge of the pipes or ducting and cannot easily be positioned so as to fit into channels with a width less than $d_2$. In addition the shroud (32) is not very effective to collect dust when a hole is to be drilled into a corner as the forward rim of the shroud is adapted to fit to a flat surface and so will not fit the shape of the corner.

BRIEF SUMMARY OF THE INVENTION

The present invention aims to provide a flexible design of shroud arrangement for a dust collection unit which can be used for efficiently collecting dust when a drilling and/or hammering tool is used to work on a variety of difficult to reach locations.

According to a first aspect of the present invention there is provided a dust collection unit suitable for use with a hand held drilling and/or hammering tool, comprising:

a shroud of the dust extraction unit adapted to extend around a tool or bit of such a hammering and/or drilling tool so as to collect dust in an airflow passing through the shroud which dust is generated by such a tool or bit; and a tube like extension sleeve which extends forwardly of the shroud;

characterised in that a slideable sleeve is slideably mounted on the extension sleeve so as to move between a retracted position in which the forward rim of the extension sleeve is engageable with a surface to be worked and an extended position in which a forward rim of the slideable sleeve is engageable with a surface to be worked and the forward ends of the extension sleeve and the slideable sleeve are shaped differently from each other so as to fit against a different shaped work surface.

This provides a more versatile shroud arrangement on a dust extraction unit which can be used to collect dust when different shaped work surfaces are drilled. Also, by using a shroud equipped with the tube like forward extension sleeve, dust can be collected, when a tool or bit of a hammering and/or drilling tool is used to drill into a channel or around an obstruction.

Preferably one of the extension sleeve or the slideable sleeve is tapered at its forward end so as to have a forward rim which fits into a corner surface to be worked. The other of the extension sleeve or the slideable sleeve may have a forward rim which extends perpendicularly to the longitudinal axis of such a tool or bit so as to fit against a plane surface to be worked. With the slideable sleeve in one of its extended or retracted positions, the tapered rim of the one of the extension or slideable sleeve fits against the surfaces of a corner so that an airflow passing into the shroud, for example in the region of the rim, carries any dust generated by the tool or bit in the generated airflow. When it is necessary to drill into the flat base of a channel, or into a working surface adjacent to pipes or boxed in cables, with the slideable sleeve in the other of its extended or retracted positions, the rim of the other of the extension sleeve or slideable sleeve can fit against the surface to be worked so that an airflow passing into the shroud, for example in the region of the rim, carries any dust generated by the tool or bit in the generated airflow. Thus, a dust collection unit having a versatile dust collection shroud is provided. In a preferred embodiment the extension sleeve has a tapered forward rim and the sliding sleeve has a plane forward rim.

To provide additional flexibility, the tube like extension sleeve and the slideable sleeve may be formed as an adapter which can be releasably fitted to the shroud. Therefore, when boring into a large flat surface, such as an interior wall of a house, a conventional shroud of relatively small size, for example of the type (32) shown in FIG. 2, can be used. Then when drilling into a channel or into a corner, the adapter can be fitted to the shroud, for example using a snap fit connection or a simple friction connection.

In order to fit against the surfaces of a corner, the tapered forward rim of the relevant sleeve may be tapered so as to have a pair of opposing V-shaped ridges. In a simple form, the tube like extension sleeve and the slideable sleeve may be cylindrical.

The sliding sleeve may be slideably mounted around the extension sleeve or alternatively may be slideably mounted within the extension sleeve. Where the extension sleeve is the tapered sleeve, the sliding sleeve may be biased into its extended position by a spring arrangement, so that when it is necessary to drill into a corner the sliding sleeve may be retracted against the biasing force of the spring, for example automatically, by engagement with the corner surface to be worked. Alternatively some releasable means may be provided to maintain the sliding sleeve in the retracted position.

According to a second aspect of the present invention there is provided a shroud adapter suitable for fitment to a dust collecting shroud of a dust collection unit, which dust collection unit is suitable for use with a hand held drilling and/or hammering tool, the adapter comprising a tube like extension sleeve which can be releaseably fitted to such a shroud so as to extend forwardly from such a shroud, characterised in that a slideable sleeve is slideably mounted on the extension sleeve so as to move between a retracted position in which the forward rim of the extension sleeve is engageable with a surface to be worked and an extended position in which a forward rim of the slideable sleeve is engageable with a surface to be worked and the forward ends of the extension sleeve and the slideable sleeve are shaped differently from each other so as to fit against a different shaped work surface.

According to a third aspect of the present invention there is provided a dust collection shroud suitable for use with a dust collection unit, which dust collection unit is suitable for use with a hand held drilling and/or hammering tool, which shroud can be releasably fitted to such a dust extraction unit and so as to extend around a tool or bit of such a hammering and/or drilling tool so as to collect dust in an airflow passing through the shroud which dust is generated by such a tool or bit, the shroud additionally comprising a tube like extension sleeve which extends forwardly, with respect to such a tool or bit, characterised in that a slideable sleeve is slideably mounted on the extension sleeve so as to move between a retracted position in which the forward rim of the extension sleeve is engageable with a surface to be worked and an extended position in which a forward rim of the slideable sleeve is engageable with a surface to be worked and the forward ends of the extension sleeve and the slideable sleeve are shaped differently from each other so as to fit against a different shaped work surface.

The second and third aspects of the present invention have the same advantages and subsidiary features as are described above in relation to the first aspect of the present invention.

BRIEF DESCRIPTION OF THE DRAWINGS

One form of a shroud arrangement of a dust collection unit in accordance with the present invention will now be described by way of example with reference to the accompanying drawings in which.

DETAILED DESCRIPTION OF THE INVENTION

Figure 1:
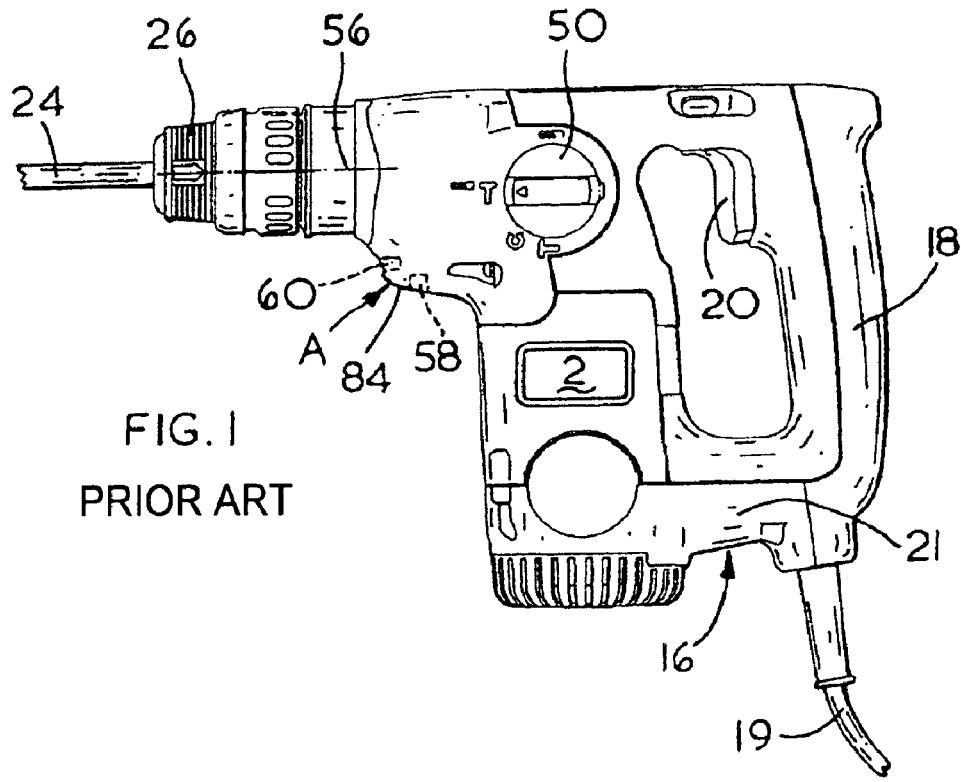
FIG. 1 shows a perspective view of a rotary hammer to which a dust collection unit in accordance with the present invention can be fitted.

The hand held rotary hammer shown in FIG. 1 has a housing comprising a motor housing portion (2) within which an electric motor of the hammer is housed. A tool holder (26) is located at the forward end of a spindle of the hammer. A tool or bit (24) can be non-rotatably and releasably fitted within the tool holder so as to allow limited reciprocation of the tool or bit with respect to the tool holder. The hammer has a rear handle (18) in which an on/off trigger (20) is located for actuating a switch for actuating power supply to the motor. The motor of the hammer selectively drives a spindle drive mechanism for rotatingly driving the spindle of the hammer, thereby rotatingly driving the tool holder (26) and a tool or bit (24) mounted therein, as is well known in the art. Also, the motor of the hammer selectively drives an air cushion hammering mechanism for repeatedly impacting the tool or bit (24), as is well known in the art. A mode change arrangement, actuated by a mode change knob (50), is provided for enabling the selective engagement of rotary drive to the spindle and/or selective actuation of the air cushion hammering mechanism so that the hammer can be operated in a drilling only mode, a hammering only mode and/or a combination rotary hammering mode, as is well known in the art. The rotary hammer is powered by a mains or generator supply of electricity, via a cable (19).

Figure 2:
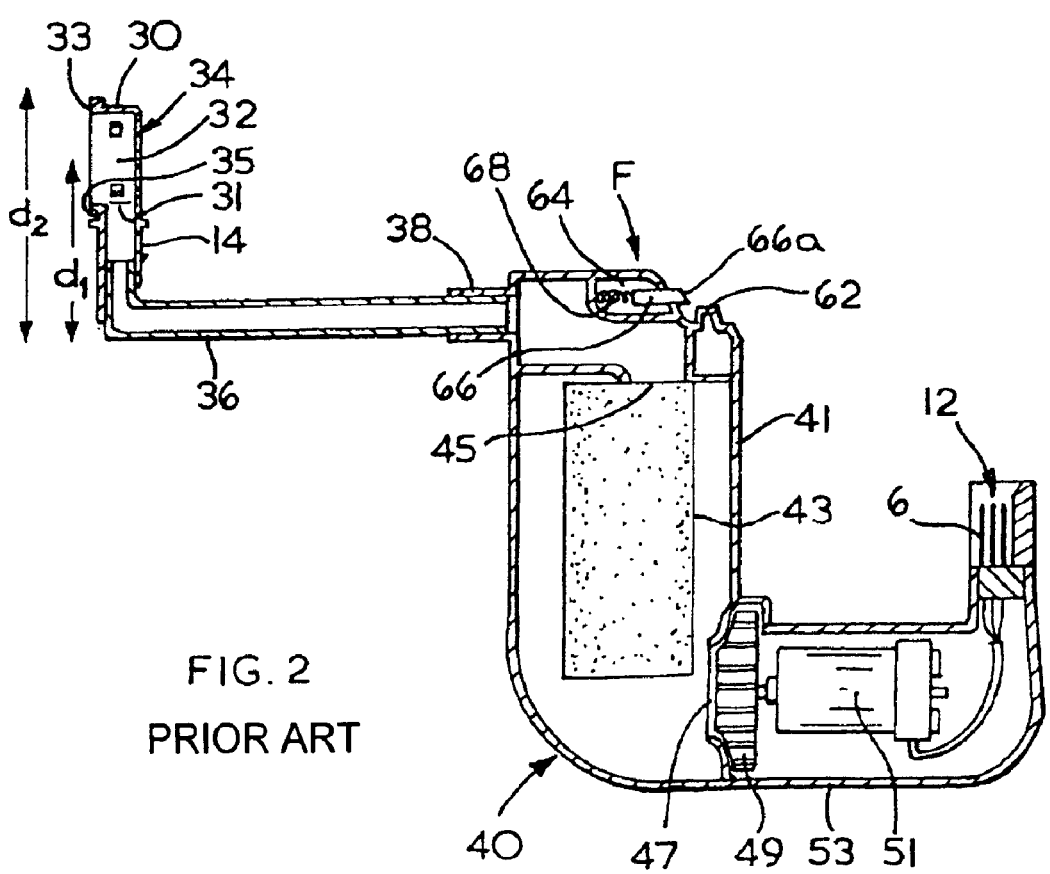
FIG. 2 shows a longitudinal cross-section of a dust collection unit for attachment to the rotary hammer of FIG. 1.

FIG. 2 shows a dust collection unit (40) for the hammer. The dust collection unit comprises a dust collection shroud (32) which, when the unit (40) is mounted on the hammer, surrounds the forward end of a tool or bit (24) mounted in the tool holder (26) of the hammer. The shroud (32) forms a chamber around the forward end of the tool or bit (24), with an annular side wall (30) and a rearward wall which is formed by a flexible brush, or seal (34) which fits around the tool or bit (24). The shroud (32) has an extension (14) which is mounted on a forward end of a support arm (36). The annular wall (30) has an opening (13) at the entrance to the extension (14), to enable a channel through the extension (14) to communicate with the shroud chamber. A support arm (36) of the dust collection unit is telescopically mounted within a receiving portion (38) of a main housing of the dust collection unit (40). The support arm (36) can be pushed into the receiving portion (38) against a biasing force from a spring arrangement (not shown) contained in the receiving portion (38). A channel extends along the support arm (36) with a first end of the channel communicating with the chamber of the shroud (32), via the extension (14), and the second end of the channel communicating with an entrance (45) to a filter chamber (41) of the unit (40).

A filter arrangement, for example a filter bag (43) is housed within the filter chamber. The filter chamber has an inlet (45) which communicates with the channel in the support arm (36) and an outlet (47) which communicates with an inlet to a fan (49). The fan is powered by a motor (51) housed in the rearward housing portion (53) of the dust collection unit (40).

With the dust collection unit of FIG. 2 is mounted on the rotary hammer of FIG. 1, the forward end of the tool or bit (24) is pressed against the surface to be worked and the shroud (32) is positioned, by telescoping the support arm (36) within the receiving portion (38), so that a forward rim (33) of the shroud (32) is pressed against a flat surface to be worked. Then when the motor of the hammer is actuated, by depressing the trigger (20) of the hammer, the motor of the hammer is actuated and drilling and/or hammering commences, depending on the mode of operation of the hammer selected by the mode change knob (50). The depression of the trigger (20) also actuates the motor (51) of the dust extraction unit (40) fitted to the hammer, as described below.

The fan (49) generates an airflow which is pulled into the shroud (32), for example via one or more recesses (35) in the forward face of the rim (33) of the shroud (32), and from the shroud, via the extension (14), through the channel in the support arm (36) and into the inlet (45) to the filter housing (41). The dust generated by the working of the tool or bit is entrained in this airflow and thus transported into the filter housing. The dust is captured in the filter housing in the filter bag (43) and the air passes through the filter bag and into the inlet (47) of the fan (49). The air passes through the fan and is discharged out of an outlet of the fan formed in the rearward housing portion (53) of the dust collection unit. As the tool or bit (24) moves into the surface being worked, the support arm (36) retracts against the biasing force of the spring arrangement and maintains the forwardmost rim of the shroud against the surface being worked. When the trigger (20) of the hammer is released, the power to the hammer motor and the fan motor (51) is disconnected.

When the dust collection unit (40) is fitted to the hammer, an electrical connection is formed between the motor (51) of the dust collection unit and the electricity supply to the hammer via a three pinned plug element (12). The region of the hammer (21), which connects the lower end of the rear handle (18) with the motor housing (2) is formed on its underside with a socket arrangement (16). The socket arrangement (18) is formed with three sockets for receiving three pins (6) of the plug arrangement (12) in order to make an electrical connection between the motor (51) of the dust collection unit (40) and the electrical power supply to the hammer.

The region (A) of the housing of the hammer is formed with a downwardly facing positioning bore (58) and a forwardly facing recess (60) (both illustrated in dotted lines). The region (F) of the housing of the dust collection unit (40) is formed with a corresponding cylindrical upwardly extending positioning projection (62) for cooperating with the positioning bore (58) in the region (A) of the hammer housing. The region (F) of the dust collection unit (40) is also provided with a manually retractable latch arrangement (66), for releasably engaging with the recess (60) in the region (A) of the hammer housing.

To connect the dust collection unit to the hammer, the plug arrangement (12) of the dust collection unit is fitted to the socket arrangement (16) of the hammer, so as to form an electrical connection between the power supply to the hammer and the fan motor (51). With the plug arrangement (12) inserted in the socket arrangement (16), the forward end of the dust collection unit (40) can be moved upwardly towards engagement with the hammer housing until the positioning projection (62) on region (F) of the dust collection unit engages in the corresponding positioning recess (58) in region (A) of the hammer housing. In this movement a rearward end of the latching peg (66) is pushed into the chamber (64) in the region (F) of the dust collection unit, against the biasing force of a spring (68) by the portion (84) of the hammer housing between the bore (58) and recess (60). Then as soon as the rearward end (66a) of the latch peg comes into alignment with the recess (60) in region (A) of the hammer housing the spring (68) biases the rearward end of the latch peg (66) into engagement with the recess (60), to thereby secure the dust collection unit to the hammer.

The dust collection unit is released from the hammer housing by a user depressing a button formed by an actuator of the latch arrangement, causing the latch peg (66) to retract from the recess (60). Then the dust collection unit can be moved downwardly to disengage the plug arrangement (12) from the socket arrangement (16).

A tube like shroud adapter (22), shown in FIGS. 3 to 6B, can be releaseably fitted within the forwardly open annular portion (30) of the shroud by a friction or a snap fit connection.

Figure 6A:
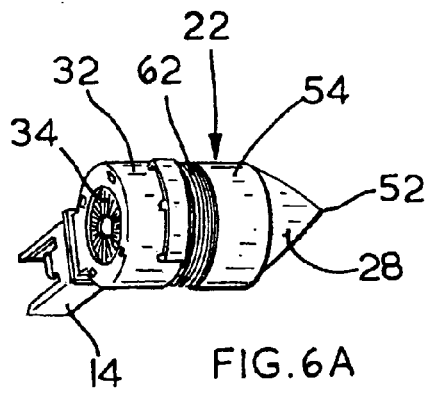
FIGS. 6A and 6B show the shroud arrangement of FIGS. 3, 4A and 4B from two perspective views in the retracted position.
Figure 6B:
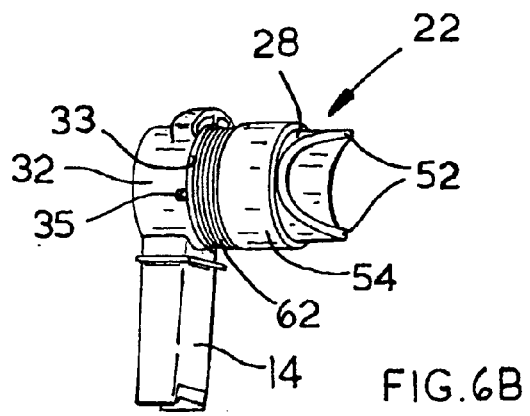

The adapter comprises a cylindrical sleeve (28) the rearward end of which can be releaseably fitted within the annular portion (30) of the shroud (32). The adapter has a sliding sleeve (54) slideably mounted on the cylindrical sleeve (28) so as to be able to move between a retracted position, as shown in FIGS. 4A, 6A and 6B, and an extended position, as shown in FIGS. 3, 4B, 5A and 5B. The sliding sleeve (54) may, for example be made of a transparent plastic material.

In the retracted position, the adapter can be used for collecting dust when drilling into corners. At the forward end of the cylindrical sleeve (28) are formed two opposing V-shaped ridges (52). The ridges at the forward end of the cylindrical sleeve (28) enable the shroud adapter to fit into a corner. Where a hole is to be bored into a corner, the adapter (22) is fitted to the shroud, and the support arm (36) is positioned with respect to the receiving portion (38) so that the forward edge of the cylindrical sleeve (28) with its V-shaped ridges (52) will fit against the surfaces forming the corner. That is, the tip of the tool or bit (24) will be aligned with the points of the V-shaped ridges of the sleeve (28). Thus, any dust generated will be entrained in an airflow, which airflow enters the forward end of the sleeve (28) and then into the shroud (42), channel (14), support arm (36) and filter chamber (41). The airflow is pulled through the filter bag (43) and into the fan. Dust generated by the boring of a hole by the tool or bit (24) will be entrained in this airflow will be deposited in the filter bag (43).

Figure 4A:
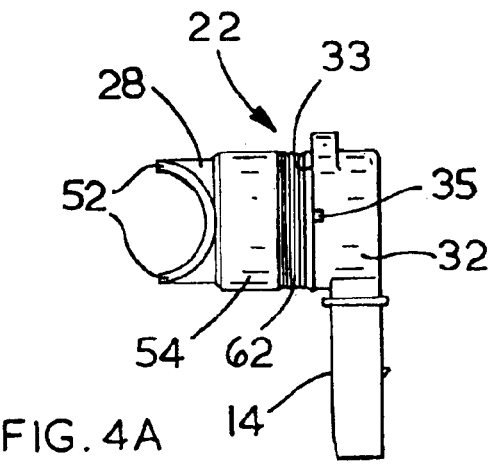
FIG. 4A shows a side view of the shroud arrangement of FIG. 3 in a retracted position for collecting dust when holes are bored in corners.
Figure 4B:
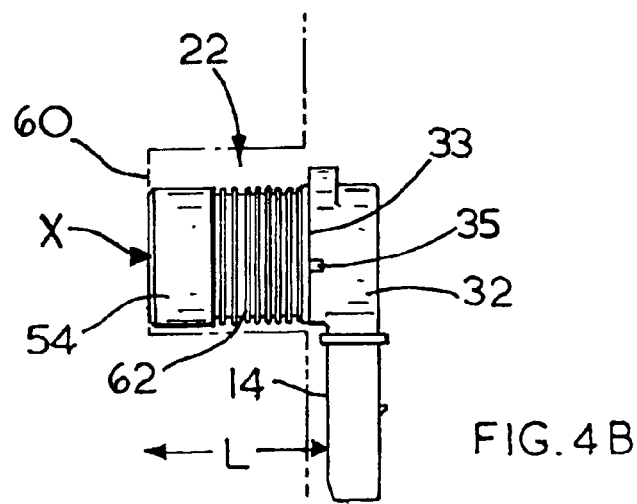
FIG. 4B shows a similar view to that in FIG. 4A but with the shroud arrangement in an extended position.
Figure 5A:
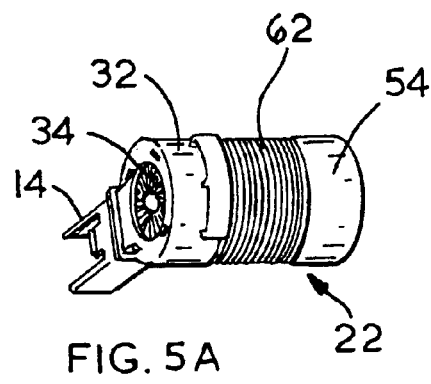
FIGS. 5A and 5B show the shroud arrangement of FIGS. 3, 4A and 4B from two perspective views in the extended position.
Figure 5B:
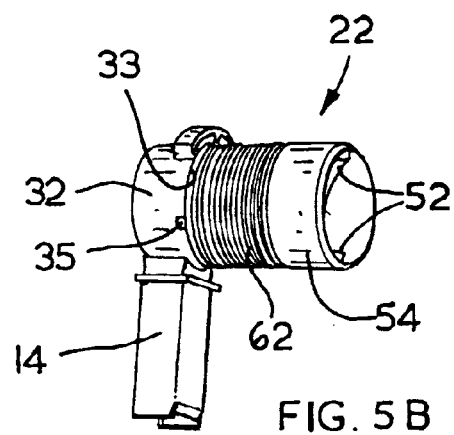

In the extended position, the adapter can be used to collect dust when drilling into channels or in wall surfaces adjacent to pipes or boxed in wires. This is because fitting the adapter (22) with the sliding sleeve in the extended position, onto the shroud increases the axial length (L) (See FIG. 4B) of the shroud/adapter assembly forwardly of the forward face of the extension (14). Thus, the adapter could be used to collect dust from a hole drilled in a position (X) of a surface (60) (shown in dotted lines) of a channel (shown in dotted lines), as shown in FIG. 4B, whereas the shroud alone, as shown in FIG. 2, would not easily fit into the channel.

Figure 3:
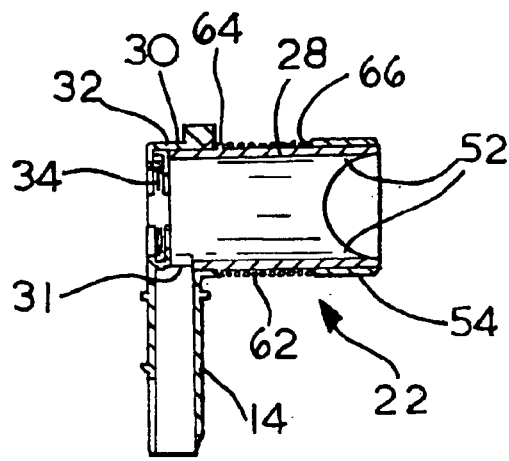
FIG. 3 shows a longitudinal cross-section of a shroud arrangement for use with the dust collection unit of FIG. 1 in accordance with the present invention.

The sliding sleeve (54) is forwardly biased on the cylindrical sleeve (28) into the extended position shown in FIG. 3, by a spring (62). The spring is connected at its rearward end and bears against an annular shoulder (64) formed around the cylindrical sleeve (28) and is connected at its forward end and bears against the rearward edge (66) of the sliding sleeve (54). The sliding sleeve is held on the cylindrical sleeve (28) by the spring (62). The sliding sleeve (54) can be retracted automatically by engagement with the surfaces of a corner against which the shroud adapter (22) is urged. Alternatively, the sliding sleeve may be retracted manually and held in the retracted position by a releasable catch.

As an alternative to the design described above, the shroud (32) and the cylindrical sleeve (28) could be formed as a single part, which could be fitted on the extension arm (36) via the extension (14) in place of the shroud (32) of FIG. 2.

What is claimed is:

1. A dust collection unit suitable for use with a hand held drilling and/or hammering tool, comprising:

a shroud (34) adapted to extend around a tool or bit (24) of such a hammering and/or drilling tool so as to collect dust in an airflow passing through the dust extraction unit which dust is generated by such a tool or bit; and a tube like extension sleeve (28) which extends forwardly from the shroud, with respect to such a tool or bit; and characterised in that a slideable sleeve (54) is slideably mounted on the extension sleeve so as to move between a retracted position in which the forward rim of the extension sleeve is engageable with a surface to be worked and an extended position in which a forward rim of the slideable sleeve is engageable with a surface to be worked and the forward ends of the extension sleeve and the slideable sleeve are shaped differently from each other so as to fit against a different shape of work surface.

2. A dust collection unit according to claim 1 wherein the extension sleeve is tapered at its forward end so as to have a forward rim which fits into a corner of a surface to be worked.

3. A dust collection unit according to claim 2 wherein the tapered forward rim is formed to have a pair of opposing V-shaped ridges (52).

4. A dust collection unit according to claim 2 or claim 3 wherein the slideable sleeve has a forward rim which extends perpendicularly to the longitudinal axis of such a tool or bit so as to fit against a plane surface to be worked.

5. A dust collection unit according to claim 1 wherein the tube like extension sleeve and the slideable sleeve are formed as an adapter (22) which can be releasably fitted to the shroud.

6. A dust collection unit according to claim 1 wherein the sliding sleeve is slideably mounted around the extension sleeve.

7. A dust collection unit according to claim 1 wherein the sliding sleeve is biased into its extended position by a spring arrangement (62).

8. A dust collection unit according to claim 1 further comprising an extension arm (36) on which the shroud (32) can be mounted, a filter housing (41) which communicates with the shroud via the extension arm and incorporates a filter, arranged such that the dust collecting airflow passes from the shroud, through the extension arm, into the filter housing and through the filter.

9. A dust collection unit according to claim 8 wherein the dust collection unit (40) includes a fan (51) for generating the dust collecting airflow.

10. A shroud adapter suitable for fitment to a dust collecting shroud (34) of a dust collection unit (40) which dust collection unit is suitable for use with a hand held drilling and/or hammering tool, the shroud adapter comprising a tube like extension sleeve (28) which can be releaseably fitted to said shroud so as to extend forwardly from said shroud, characterised in that a slideable sleeve (54) is slideably mounted on the extension sleeve so as to move between a retracted position in which the forward rim of the extension sleeve is engageable with a surface to be worked and an extended position in which a forward rim of the slideable sleeve is engageable with a surface to be worked and the forward ends of the extension sleeve and the slideable sleeve are shaped differently from each other so as to fit against a different shape of work surface.

11. An adapter according to claim 10 wherein the extension sleeve is tapered at its forward end so as to have a forward rim which fits into a corner of a surface to be worked.

12. An adapter according to claim 11 wherein the tapered forward rim is formed to have a pair of opposing V-shaped ridges (52).

13. An adapter according to any one of claim 11 or claim 12 wherein the slideable sleeve has a forward rim which is shaped to fit against a plane surface to be worked.

14. An adapter according to claim 10 wherein the sliding sleeve is slideably mounted around the extension sleeve.

15. An adapter according to claim 10 wherein the sliding sleeve is biased into its extended position by a spring arrangement (62).

16. A shroud for a dust collection unit (40), which dust collection unit is suitable for use with a hand held drilling and/or hammering tool, which shroud can be releasably fitted to such a dust extraction unit so as to extend around a tool or bit (24) of such a hammering and/or drilling tool so as to collect dust in an airflow passing through the shroud which dust is generated by such a tool or bit, the shroud additionally comprising a forwardly extending tube like extension sleeve (28), characterised in that a slideable sleeve (54) is slideably mounted on the extension sleeve so as to move between a retracted position in which the forward rim of the extension sleeve is engageable with a surface to be worked and an extended position in which a forward rim of the slideable sleeve is engageable with a surface to be worked and the forward ends of the extension sleeve and the slideable sleeve are shaped differently from each other so as to fit against a different shape of work surface.

17. A shroud according to claim 16 wherein the extension sleeve is tapered at its forward end so as to have a forward rim which fits into a corner of a surface to be worked.

18. A shroud according to claim 17 wherein the tapered forward rim is formed to have a pair of opposing V-shaped ridges (52).

19. A shroud unit according to claim 17 or 18 wherein the slideable sleeve has a forward rim which extends perpendicularly to the longitudinal axis of such a tool or bit so as to fit against a plane surface to be worked.

20. A shroud accordingly to claim 16 wherein the sliding sleeve is slideably mounted around the extension sleeve.

21. A shroud according to claim 16 wherein the sliding sleeve is biased into its extended position by a spring arrangement (62).

* * * * *